Jan. 7, 1958 G. A. DARKENWALD 2,818,670
NET CARRYING CASE
Filed Jan. 2, 1957 2 Sheets-Sheet 1

George A. Darkenwald
INVENTOR.

BY
Attorneys

Jan. 7, 1958 G. A. DARKENWALD 2,818,670
NET CARRYING CASE
Filed Jan. 2, 1957 2 Sheets-Sheet 2

George A. Darkenwald
INVENTOR.

United States Patent Office 2,818,670
Patented Jan. 7, 1958

2,818,670

NET CARRYING CASE

George A. Darkenwald, Billings, Mont.

Application January 2, 1957, Serial No. 632,073

4 Claims. (Cl. 43—11)

This invention relates in general to new and useful fish landing nets, and more specifically to an improved carrying case for fish landing nets.

While a fish landing net is provided with a strap to facilitate the carrying thereof, the net portion thereof dangles alongside a fisherman and as a result the net is continuously being caught on thorny bushes, dead trees, tree branches, stumps, and similar objects. Not only does this hinder the fisherman in his movements, but in many instances a net has either been jerked loose which requires it retrieving or a hole has been torn in the net proper to render the net useless. As a result, many fishermen have discontinued carrying fish landing nets.

It is therefore the primary object of this invention to provide a case for encasing a fish landing net to facilitate the carrying thereof, the casing having hingedly mounted sections which may swing to out of the way positions to permit the net portion of the fish landing net to come into play.

Another object of this invention is to provide a carrying case for fish landing nets, the carrying case including a net supporting frame from which the net proper of the fish landing net normally depends, there being mounted on the net supporting frame upper and lower cover plates which encase both the net supporting frame and a net carried by the net supporting frame, the cover plates having sections which are hingedly mounted for swinging away from each other, there being provided suitable latch means for normally retaining the sections in a net encasing position.

A further object of this invention is to provide an improved carrying case for fish landing nets, the carrying case including hingedly mounted sections, the sections being spring urged apart whereby they will automatically move to out of the way positions upon being released, there being provided a suitable latch for normally retaining the sections in a net encasing position, the latch being provided with a releasing member which is positioned adjacent the handle of the net for ease of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
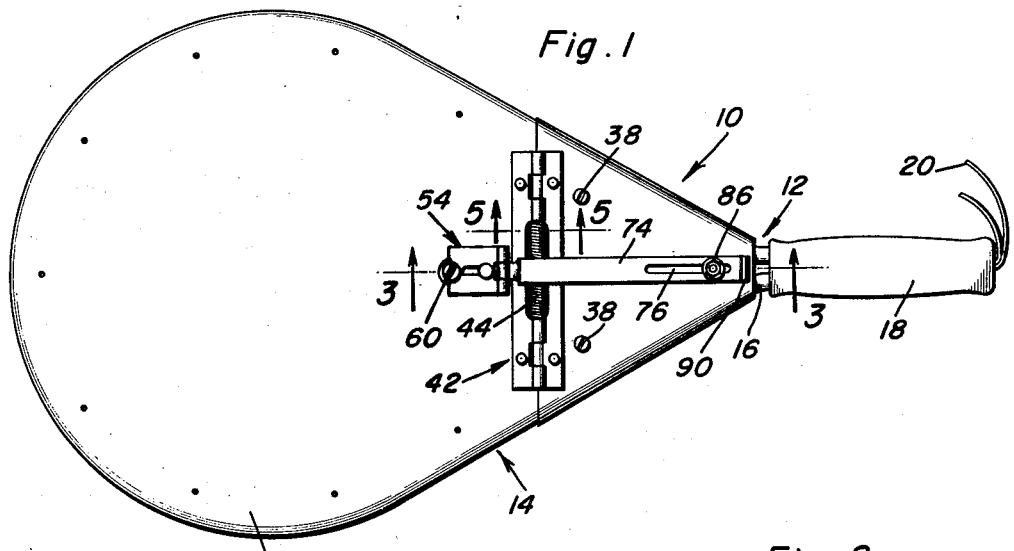
Figure 1 is a top plan view of a fish landing net having the carrying case thereof mounted thereon.

Referring now to the drawings in detail, it will be seen that there is illustrated a fish landing net assembly which is referred to in general by the reference numeral 10. The fish landing net assembly 10 includes the customary fish landing net construction which is referred to in general by the reference numeral 12 and a carrying case which is referred to in general by the reference numeral 14.

Figures 4, 5:
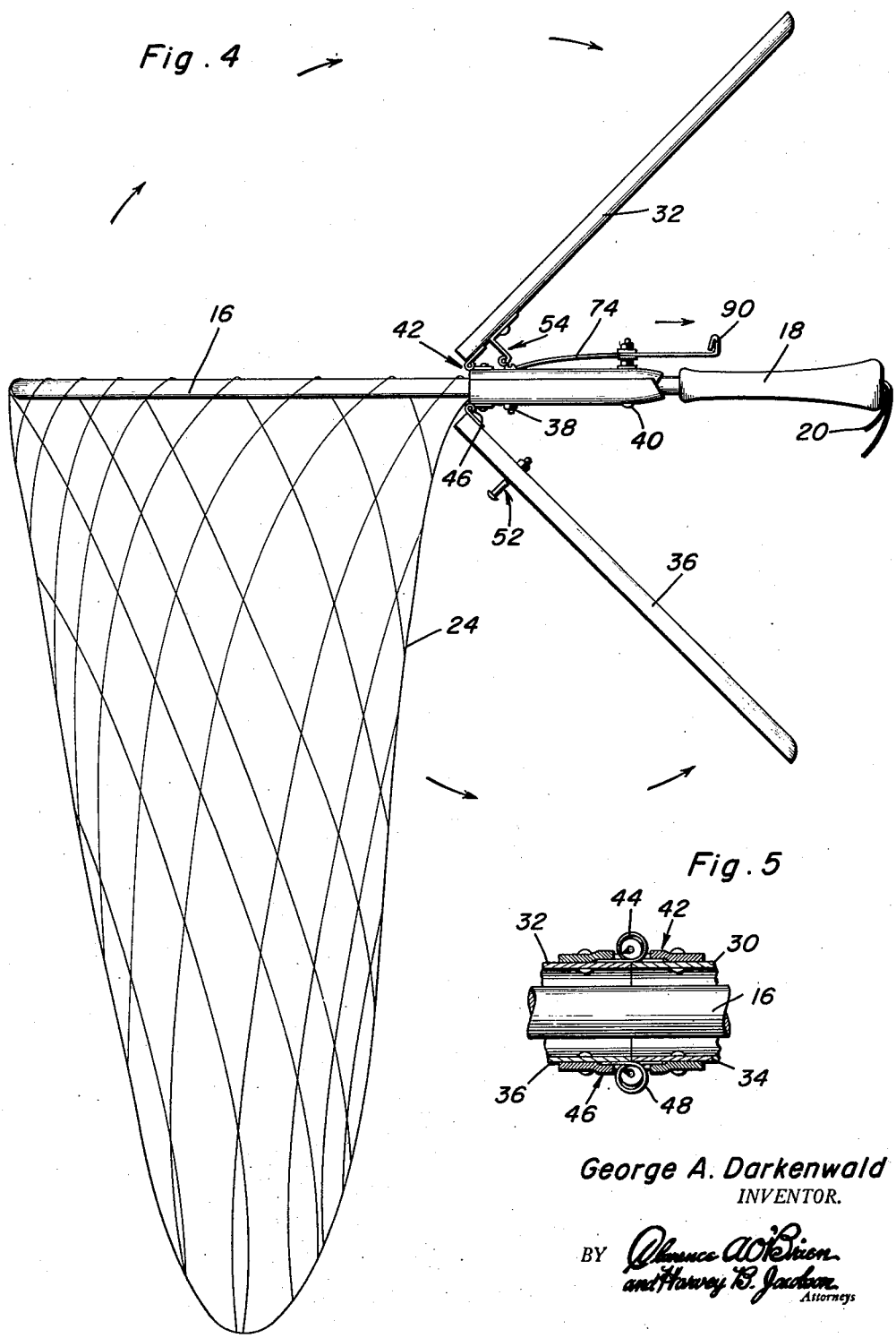
Figure 4 is a side elevational view similar to Figure 2 and shows the carrying case in a released position with the net depending from the net supporting frame ready for use in landing a fish.
Figure 5 is an enlarged fragmentary sectional view taken substantially upon the plane indicated by the section line 5—5 of Figure 1 and shows the specific details of spring type hinges pivotally mounting sections of the cover plates.

The fish landing net construction 12 includes a net supporting frame 16 which is formed of a rod bent to the general configuration illustrated in Figure 1 and having adjacent rear portions connected together by a handle 18. Extending from the handle 18 is a carrying strap 20. Suitably engaged over a forward portion of the net supporting frame 16 and depending therefrom is a net member 24, as is best illustrated in Figure 4. The position of the net member 24 illustrated in Figure 4 is the normal operating position of the net member. However, the net member 24 is relatively long and dangles alongside the fisherman when walking and becomes entangled with any foreign matter which may pass closely adjacent the fisherman.

In order that the net 24 may be retained generally within the confines of the net supporting frame 16, the carrying case 14 has been provided. The carrying case 14 includes an upper cover plate 26 and a lower cover plate 28. The cover plates 26 and 28 are substantially identical with the cover plate 26 including a fixed section 30 and a hinged section 32 while the cover plate 28 includes a fixed section 34 and a hinged section 36.

The cover plates 26 and 28 are secured on the net supporting frame 16 by means of a pair of widely spaced forwardly disposed bolts 38 and a rear bolt 40 which is centrally disposed. The bolts 38 and 40 extend through the fixed sections 30 and 34 and clamp them to the rear portion of the net supporting frame 16.

The section 32 is connected to the fixed section 30 by means of a hinge 42. The hinge 42 includes a centrally disposed spring 44 which is so positioned whereby it urges the section 32 upwardly and rearwardly to the position illustrated in Figure 4. The section 36 is connected to the fixed section 34 by means of a hinge 46. The hinge 46 is identical with the hinge 42 and includes a central spring 48 which urges the section 36 downwardly and rearwardly, as is best illustrated in Figure 4.

Figure 3:
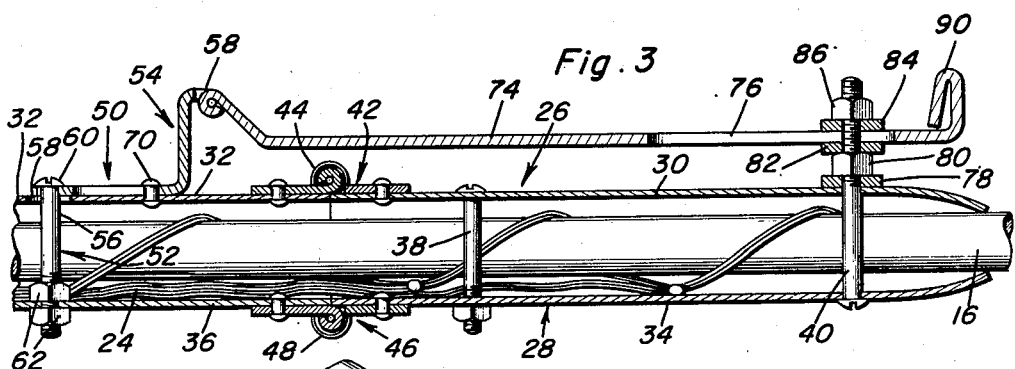
Figure 3 is an enlarged fragmentary sectional view taken substantially upon the plane indicated by the section line 3—3 of Figure 1 and shows the specific mounting of the carrying case on the net supporting frame and the details of the hinge mounting of the sections of the carrying case and the latch for retaining the sections in a net encasing position.
Figure 6:
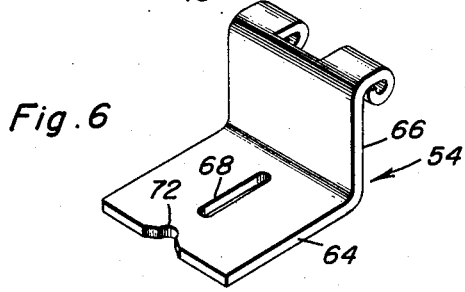
Figure 6 is an enlarged rotated perspective view of a latch member used in retaining the sections in a net encasing position.

In order that the sections 32 and 36 may be retained in net encasing positions against the urgence of the springs 44 and 48, there is provided a latch which is referred to in general by the reference numeral 50. The latch 50 includes a latch element 52 and a latch member 54. The latch element 52 is in the form of a bolt 56 which is carried by the section 36 and which extends up through the net supporting frame 16 and through the section 32, the section 32 being provided with an opening 58 for receiving a head 60 of the bolt 56. The bolt 56 is secured to the section 36 by a pair of nuts 62 threadedly engaged thereon, as is best illustrated in Figure 3.

The latch member 54 is in the form of a generally L-shaped member including a lower horizontal portion 64 and a vertical portion 66. The lower horizontal portion 64 is provided with an elongated slot 68 which receives a rivet 70 for mounting thereof on the section 32 for sliding movement towards and away from the latch element 52. The forward edge of the horizontal portion 64 is provided with a recess 72 for receiving the upper part of the bolt 56 with the head 60 of the bolt 56 overlying the horizontal portion 64. Thus the latch member 54 prevents the withdrawal of the latch element 52 and serves to lock the sections 32 and 36 to each other.

The latch assembly 50 also includes a latch releasing member 74 which is relatively elongated and which is provided with an elongated slot 76 in the rear portion thereof. The bolt 40 is relatively long as compared to the bolts 38 and 34 and the sections 30 and 34 are clamped to the supporting frame 16 by means of a washer 78 and a nut 80. A washer 82 bears against the upper side of the nut 80 and underlies the releasing member 74. Another washer 84 overlies the releasing member 74 and is retained in place by a second nut 86 threadedly engaged on the upper part of the bolt 40. The releasing member 74 is mounted for sliding movement, between the washers 82 and 84.

The forward end of the releasing member 74 is connected to the rear part of the latch member 54 by means of a hinge construction 88. Also, the rear end of the releasing member 74 is provided with a finger or thumb engageable flange 90 positioned adjacent the handle 18.

Figure 2:
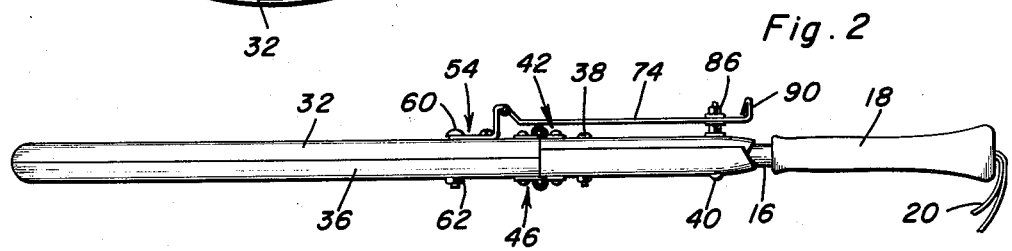
Figure 2 is a side elevational view of the fish landing net of Figure 1.

When the fish landing net assembly 10 is carried, it normally appears as illustrated in Figures 1 and 2. When it is desired to utilize the net 24 in the landing of a fish, the fisherman pulls the releasing member 74 rearwardly with his thumb or finger so that the latch member 54 is moved rearwardly to release the latch element 52. The springs 44 and 48 then swing the sections 32 and 36 to the positions illustrated in Figure 4. Inasmuch as the latch member 54 is secured to the section 32 by the rivet 70, it will swing with the section 32. For this reason the hinge connection 88 is provided between the latch member 54 and the releasing member 74. Further, the releasing member 74 must move rearwardly a considerable distance and flex slightly to permit the swinging of the latch member 54 with the section 32.

It is to be understood that the cover plates 26 and 28 as well as the other components of the carrying case 14 will be formed of lightweight material. It is preferred that the cover plates 26 and 28 be formed of light gauge sheet aluminum or similar material.

It is to be understood that when the carrying case 14 is mounted on the fish landing net construction 12, it is merely necessary to place the two halves of the carrying case 14 on opposite sides of the net supporting frame 16 and to clamp the two halves in place by the bolts 38 and 40. No alterations whatsoever are required to be made to the net construction 12.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A carrying case for fish landing nets, said carrying case comprising a net supporting frame and a handle, upper and lower cover plates encasing said net supporting frame, said cover plates including sections, hinges hingedly mounting said sections for swinging away from each other, and a latch normally connecting together said sections and retaining said sections in a net encasing position.

2. A carrying case for fish landing nets, said carrying case comprising a net supporting frame and a handle, upper and lower cover plates encasing said net supporting frame, said cover plates including sections, hinges hingedly mounting said sections for swinging away from each other, and a latch normally connecting together said sections and retaining said sections in a net encasing position, said hinges being of the spring urged type whereby said sections move to out-of-the-way positions when released.

3. A carrying case for fish landing nets, said carrying case comprising a net supporting frame and a handle, upper and lower cover plates encasing said net supporting frame, said cover plates including sections, hinges hingedly mounting said sections for swinging away from each other, and a latch normally connecting together said sections and retaining said sections in a net encasing position, said latch including a releasing member, said releasing member being positioned adjacent said handle for ease of releasing said latch.

4. A carrying case for fish landing nets, said carrying case comprising a net supporting frame and a handle, upper and lower cover plates encasing said net supporting frame, said cover plates including sections, hinges hingedly mounting said sections for swinging away from each other, and a latch normally connecting together said sections and retaining said sections in a net encasing position, said hinges being of the spring urged type whereby said sections move to out-of-the-way positions when released, said latch including a releasing member, said releasing member being positioned adjacent said handle for ease of releasing said latch.

References Cited in the file of this patent
UNITED STATES PATENTS

| | | |
|---|---|---|
| 2,384,162 | Finn | Sept. 4, 1945 |
| 2,772,502 | Norris | Dec. 4, 1956 |